United States Patent
Morioka et al.

(10) Patent No.: US 9,801,012 B2
(45) Date of Patent: Oct. 24, 2017

(54) RADIO COMMUNICATION SYSTEM AND LOCATION CHARACTERISTIC DETERMINATION METHOD

(71) Applicant: NTT DOCOMO, INC., Tokyo (JP)

(72) Inventors: Yasufumi Morioka, Tokyo (JP); Kouki Hayashi, Tokyo (JP); Masanori Ishida, Tokyo (JP); Yoshifumi Morihiro, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/907,986

(22) PCT Filed: Jun. 10, 2014

(86) PCT No.: PCT/JP2014/065330
§ 371 (c)(1),
(2) Date: Jan. 27, 2016

(87) PCT Pub. No.: WO2015/015911
PCT Pub. Date: Feb. 5, 2015

(65) Prior Publication Data
US 2016/0174026 A1    Jun. 16, 2016

(30) Foreign Application Priority Data
Aug. 1, 2013   (JP) .................................. 2013-160683

(51) Int. Cl.
*H04W 24/00*    (2009.01)
*H04W 4/02*    (2009.01)
(Continued)

(52) U.S. Cl.
CPC ............. *H04W 4/02* (2013.01); *H04W 60/00* (2013.01); *H04W 64/00* (2013.01)

(58) Field of Classification Search
None
See application file for complete search history.

(56) References Cited

U.S. PATENT DOCUMENTS

2007/0165583 A1    7/2007    Pecen
2011/0250903 A1*   10/2011   Huang ................... G01S 5/0263
                                                           455/456.1
(Continued)

FOREIGN PATENT DOCUMENTS

JP    2010-262484 A    11/2010

OTHER PUBLICATIONS

International Search Report issued in PCT/JP2014/065330 dated Sep. 16, 2014 (2 pages).
(Continued)

*Primary Examiner* — Suhail Khan
(74) *Attorney, Agent, or Firm* — Osha Liang LLP

(57) ABSTRACT

A radio communication system includes: a visit information storage unit that stores plural visit information elements each indicating information on a visit to a cell visited by a user equipment; an event detector that detects an event that occurs in the user equipment; a cell identifier detector that detects a cell identifier that indicates a cell visited by the user equipment; and a location characteristic determiner that determines a location characteristic of the cell indicated by the cell identifier based on one or more visit information elements corresponding to the cell. The location to characteristic determiner determines the location characteristic of a cell visited by the user equipment when the event detector detects a no-cell-change event other than a cell-change event that indicates a change in the cell identifier.

5 Claims, 6 Drawing Sheets

| | VISITED CELL IDENTIFIER | VISIT START TIME | VISIT END TIME | VISIT TIME LENGTH | PING-PONGING FLAG |
|---|---|---|---|---|---|
| SE1 → | Ca | 0:00 | 8:00 | 8:00 | NO |
| SE2 → | Cb | 8:00 | 9:00 | 1:00 | NO |
| SE3 → | Cc | 9:00 | 20:00 | 11:00 | NO |

SI

(51) Int. Cl.
*H04W 64/00* (2009.01)
*H04W 60/00* (2009.01)

(56) References Cited

U.S. PATENT DOCUMENTS

| | | | | |
|---|---|---|---|---|
| 2013/0231115 A1* | 9/2013 | Lin | .................. | H04W 36/0083 455/436 |
| 2014/0274195 A1* | 9/2014 | Singh | .................. | H04W 52/241 455/522 |
| 2014/0349656 A1* | 11/2014 | Sfar | .................. | H04W 36/0088 455/437 |

OTHER PUBLICATIONS

Extended European Search Report dated Jul. 8, 2016, in corresponding European Patent Application No. 14831347.1 (7 pages).

* cited by examiner

| | VISITED CELL IDENTIFIER | VISIT START TIME | VISIT END TIME | VISIT TIME LENGTH | PING-PONGING FLAG |
|---|---|---|---|---|---|
| SE1 | Ca | 0:00 | 8:00 | 8:00 | NO |
| SE2 | Cb | 8:00 | 9:00 | 1:00 | NO |
| SE3 | Cc | 9:00 | 20:00 | 11:00 | NO |

SI

RADIO COMMUNICATION SYSTEM AND LOCATION CHARACTERISTIC DETERMINATION METHOD

TECHNICAL FIELD

The present invention relates to a radio communication system and to a location characteristic determination method.

BACKGROUND ART

Techniques have recently been proposed which provide user equipments with information (e.g., advertisement information for a shop near the location) corresponding to the location of the user equipments and which control the operation of user equipments according to the location of the user equipments. The locations of user equipments can be identified based on, for example, information measured by a GPS (Global Positioning System) or information about base stations that the user equipments are connected to by radio.

RELATED ART DOCUMENT

Patent Document

Patent Document 1: Japanese Patent Application Laid-Open Publication No. 2010-262484

SUMMARY OF THE INVENTION

Problem to be Solved by the Invention

The role or function (hereinafter may be referred to as "location characteristic") of a place (cells) in which a user equipment is located differs from one user to another. For example, a complex facility that has both a residential area and an office area is a home to one user and a workplace to another user. In other words, one facility may have different location characteristics for different users. Therefore, for techniques such as one that provides user equipments with information corresponding to the location of the user equipments or one that provides control of the operation of user equipments according to the location of the user equipments, it would be preferable that the location characteristics for users be determined. As a result, techniques such as the above may provide users with more appropriate information reflecting location characteristics and also may control the operation of user equipments more appropriately by reflecting location characteristics.

In consideration of the abovementioned situations, the present invention has as an object to more appropriately determine location characteristics of cells visited by user equipments.

Means of Solving the Problems

A radio communication system of the present invention has: a visit information storage unit which stores plural visit information elements, each indicating information about a visit to a cell visited by a user equipment; an event detector which detects an event that occurs in the user equipment; a cell identifier detector which detects a cell identifier indicating a cell visited by the user equipment; and a location characteristic determiner which determines the location characteristic of the cell indicated by the cell identifier based on one or more visit information elements corresponding to the cell. The location characteristic determiner determines the location characteristic of a cell visited by the user equipment when the event detector detects a no-cell-change event other than a cell-change event indicating a change in the cell identifier.

In a preferred embodiment of the present invention, the radio communication system further comprises a visit information editor that edits visit information elements. When the event detector detects the no-cell-change event and a cell identifier indicated by the latest visit information element that corresponds to the latest visit from among the plural visit information elements stored in the visit information storage unit matches a cell identifier detected by the cell identifier detector, subsequent to the visit information editor having updated the latest visit information element, the location characteristic determiner determines the location characteristic of the cell indicated by the cell identifier detected by the cell identifier detector. When the event detector detects the no-cell-change event and a cell identifier indicated by the latest visit information element that corresponds to the latest visit from among the plural visit information elements stored in the visit information storage unit does not match a cell identifier detected by the cell identifier detector, subsequent to the location characteristic determiner having determined the location characteristic of the cell indicated by the cell identifier that is detected by the cell identifier detector, the visit information editor generates and writes in the visit information storage unit a new visit information element corresponding to the cell identifier detected by the cell identifier detector.

In a preferred embodiment of the present invention, the radio communication system further comprises a ping-ponging state determiner configured to determine whether a ping-ponging state has occurred, in which state start and ending of a visit to a single cell is repeated. When the event detector detects the cell-change event, the visit information editor updates the latest visit information element from among plural visit information elements corresponding to a cell identifier before the cell change. When the ping-ponging state determiner determines that a ping-ponging state has occurred in the cell after the cell change, subsequent to the visit information editor having updated a visit information element corresponding to the latest visit to the cell after the cell change, the location characteristic determiner determines the location characteristic of the cell after the cell change. Meanwhile, when the ping-ponging state determiner determines that a ping-ponging state has not occurred in the cell after the cell change, subsequent to the location characteristic determiner having determined the location characteristic of the cell after cell change, the visit information editor generates and writes in the visit information storage unit a new visit information element corresponding to the cell after the cell change.

In a preferred embodiment of the present invention, the visit information editor generates the new visit information element including a time that is obtained by adding a predetermined value to the current time as a visit end time.

The location characteristic determination method according to the present invention includes, in a radio communication system comprising a visit information storage unit that stores plural visit information elements each indicating information about a visit to a cell visited by a user equipment: detecting an event that occurs in the user equipment; detecting a cell identifier indicating a cell visited by the user equipment; and determining the location characteristic of the cell indicated by the cell identifier based on one or more visit information elements corresponding to the cell. When a no-cell-change event other than a cell-change event indicating a change in the cell identifier is detected, the location characteristic of the cell visited by the user equipment is determined.

Effect of the Invention

According to the present invention, location characteristics of places (cells) that user equipments visit can be appropriately identified.

DESCRIPTION OF EMBODIMENTS

1. First Embodiment

1(1). Overview of Radio Communication System

Figure 1:
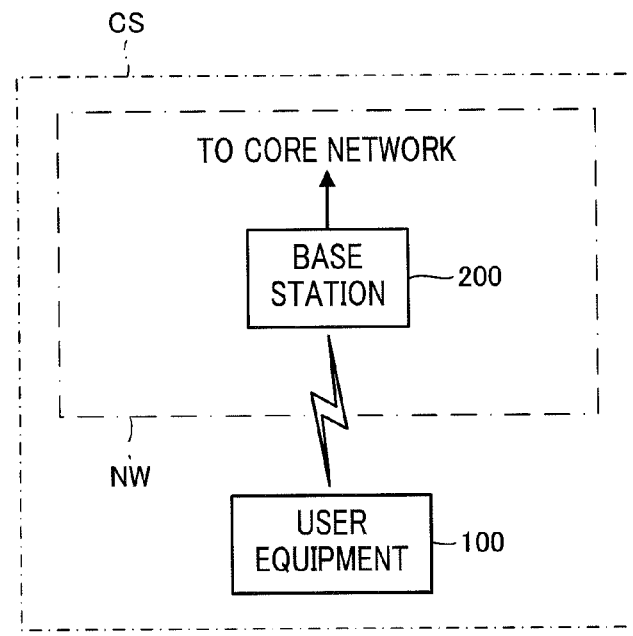
FIG. 1 is a block diagram illustrating a radio communication system according to a first embodiment.

FIG. 1 is a block diagram illustrating a radio communication system CS according to a first embodiment of the present invention. The radio communication system CS has, as its elements, a user equipment 100 and a base station 200. The base station 200 is connected to a core network provided with a switching center and a gateway, which are elements other than those shown in the figure. A network NW has the elements except for the user equipment 100 from among the above elements provided in the radio communication system CS.

Each element of the radio communication system CS executes communication in accordance with a freely selected access technology. One such example that can be employed as an access technology is an LTE/SAE (Long Term Evolution/System Architecture Evolution) standard contained in the 3GPP (Third Generation Partnership Project) standard. Multiple radio access systems that are usable include a frequency division multiple access and a time division multiple access. In the radio communication system CS, plural radio access technologies (for example, 3G and LTE) may be employed.

Figure 2:
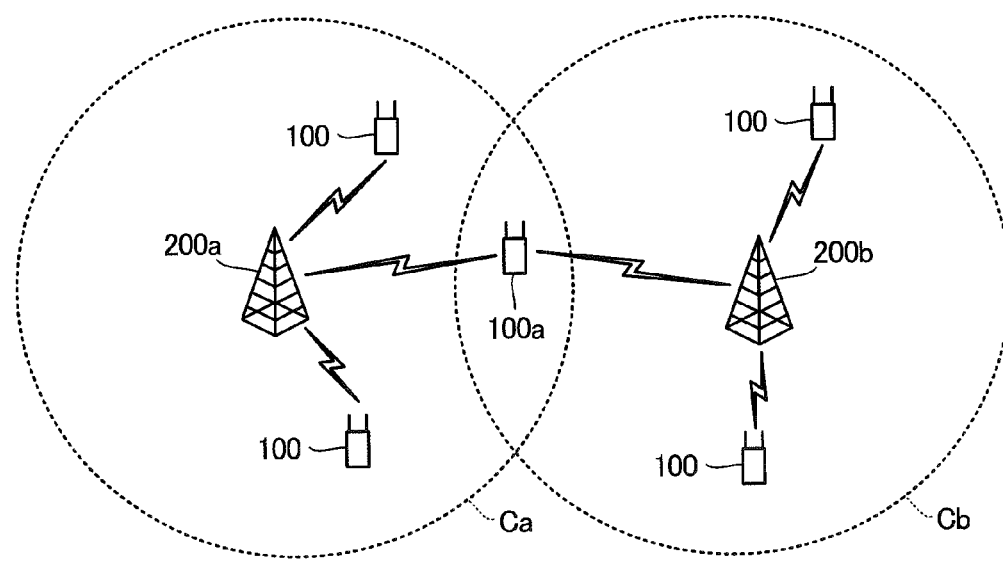
FIG. 2 is a diagram illustrating cells formed by base stations according to the first embodiment.

As shown in FIG. 2, the base stations 200 (200a and 200b) have cells C (Ca and Cb) formed therearound. Each cell C is identified by a unique cell identifier. User equipments 100 each are able to communicate by radio with the base station 200 that corresponds to a cell C that each user equipment 100 visits (is currently located in). One base station 200 may form plural cells C. A radio access technology used in each cell C may be freely selected. For example, the same radio access technology may be used across plural cells C formed by one base station 200, or different radio access technologies may be used.

In FIG. 2, a user equipment 100a may be located in both the cell Ca and the cell Cb (i.e., is located at the cell edges of the cell Ca and the cell Cb). Since the radio communication environment changes in each moment, a cell C the user equipment 100a is visiting (for example, a cell C for which the user equipment 100a has the highest reception power) changes in each moment. Such frequent changes in the visited cells, without the user equipment 100a moving significantly, is generally called "ping-ponging" or "fluttering".

1(2). Configuration of each Element

1(2)-1. Configuration of User Equipment

Figure 3:
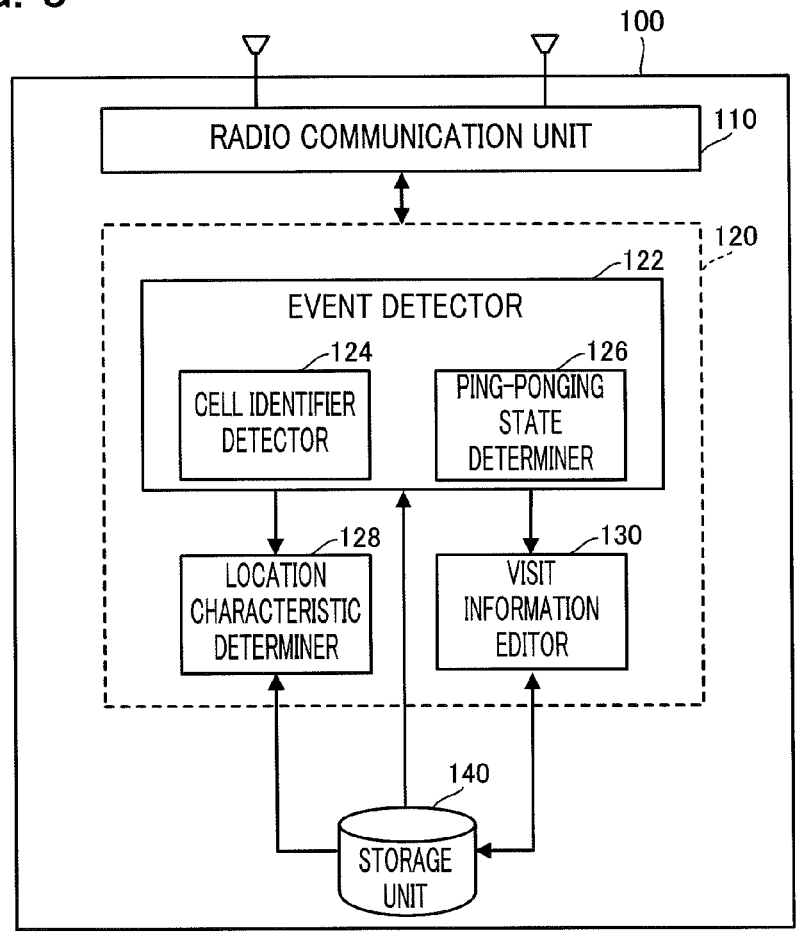
FIG. 3 is a block diagram illustrating a configuration of a user equipment according to the first embodiment.

FIG. 3 is a block diagram illustrating a configuration of the user equipment 100 according to the first embodiment. The user equipment 100 has a radio communication unit 110, a controller 120, and a storage unit 140. An output device for outputting speech, video, etc. and an input device for receiving instructions from a user are not shown for the sake of convenience. The radio communication unit 110 is an element for executing radio communication with the base stations 200, and includes a transmitter-receiver antenna, a reception circuit for receiving downlink radio signals from the base stations 200 for conversion into electric signals, and a transmission circuit for converting electric signals such as control signals and user signals into uplink radio signals. The storage unit 140 stores information (visit information SI) on communication control, in particular, information on a visit to a cell visited by the user equipment 100. The storage unit 140 thus can serve as a visit information storage unit. The visit information SI includes plural visit information elements SE, which will be described later in detail.

The controller 120 has an event detector 122, a cell identifier detector 124, a ping-ponging state determiner 126, a location characteristic determiner 128 and a visit information editor 130. The cell identifier detector 124 and the ping-ponging state determiner 126 are included in the event detector 122. The event detector 122 detects an event that occurs in the user equipment 100. The cell identifier detector 124 detects a cell identifier CID indicating a cell C visited by the user equipment 100. The ping-ponging state determiner 126 determines whether a ping-ponging state in which starts and ends of a visit to a cell C is repeated has occurred. The location characteristic determiner 128 determines a location characteristic of a cell C. A "location characteristic" is information indicating the role and function of a place (cell C) at which the user equipment 100 is located. The visit information editor 130 edits the visit information elements SE included in the visit information SI. Operations of each element in the controller 120 will be described later in more detail. The controller 120 and each element in the controller 120 are functional blocks implemented by a CPU (not shown) of the user equipment 100 executing a computer program stored in the storage unit 140 and functioning in accordance with the computer program.

1(2)-2. Configuration of Base Station

Figure 4:
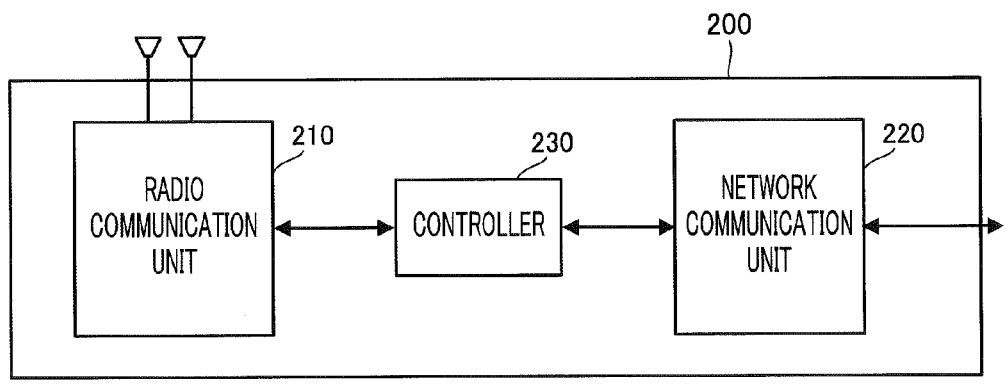
FIG. 4 is a block diagram illustrating a configuration of a base station according to the first embodiment.

FIG. 4 is a block diagram illustrating a configuration of the base station 200 according to the first embodiment. The base station 200 has a radio communication unit 210, a network communication unit 220, and a controller 230. The radio communication unit 210 is an element for executing radio communication with the user equipments 100, and is configured in substantially the same manner as the radio communication unit 110 of the user equipment 100. The network communication unit 220 is an element that executes wired communication with other nodes (other base stations 200, switching centers, gateways, etc.) in the network NW. The controller 230 transmits or receives, via the radio communication unit 210 and the network communication unit 220, signals (control signals, data signal, etc.) to and from the user equipments 100 and other nodes in the network NW. The controller 230 is a functional block implemented by a CPU (not shown) of the base station 200 executing a computer program stored in a storage unit (not shown) and functioning in accordance with the computer program.

1(3). Location Characteristic Determination Operation

Figure 5:
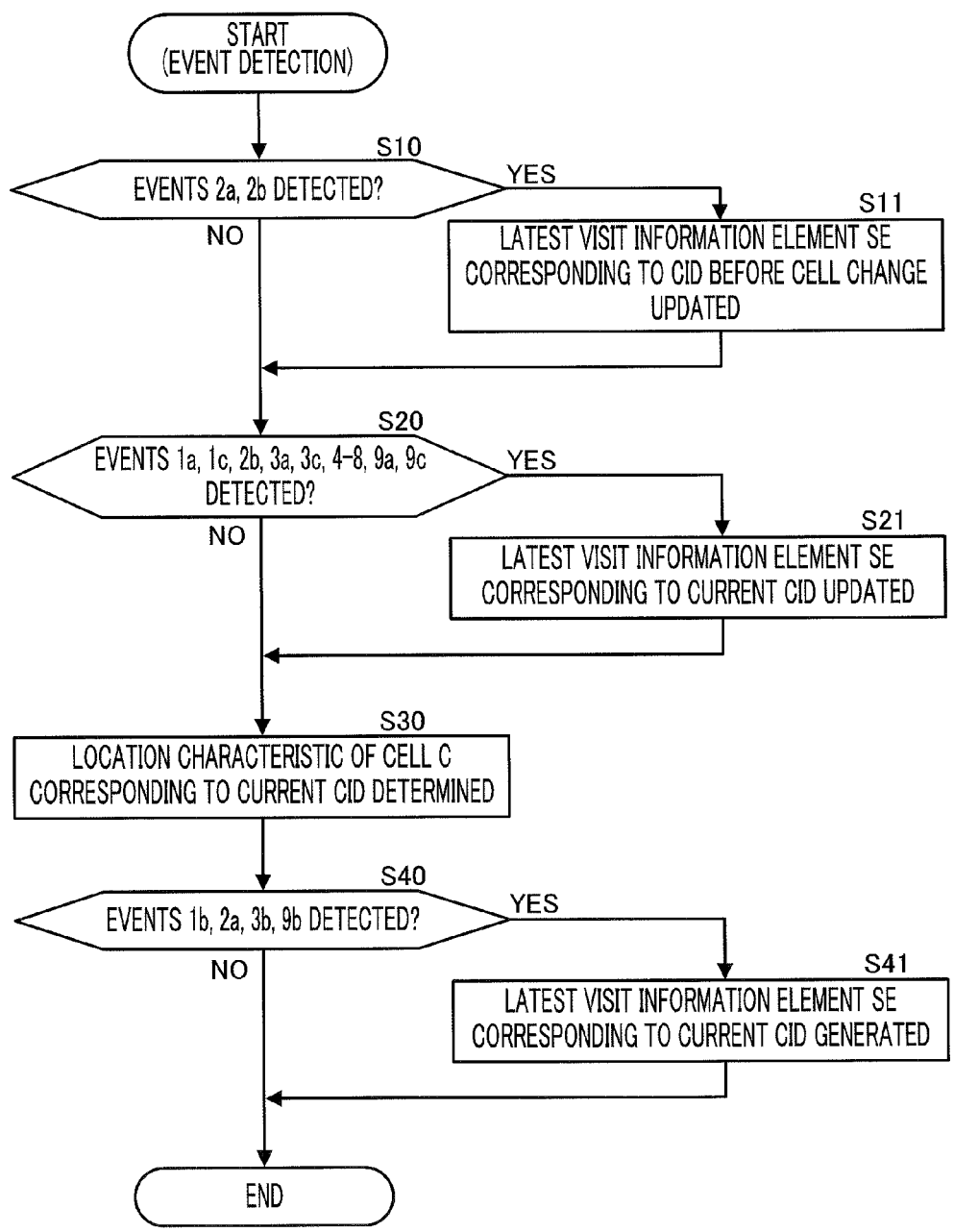
FIG. 5 is a flowchart of a determination operation of a location characteristic according to the first embodiment.
Figures 6, 7:
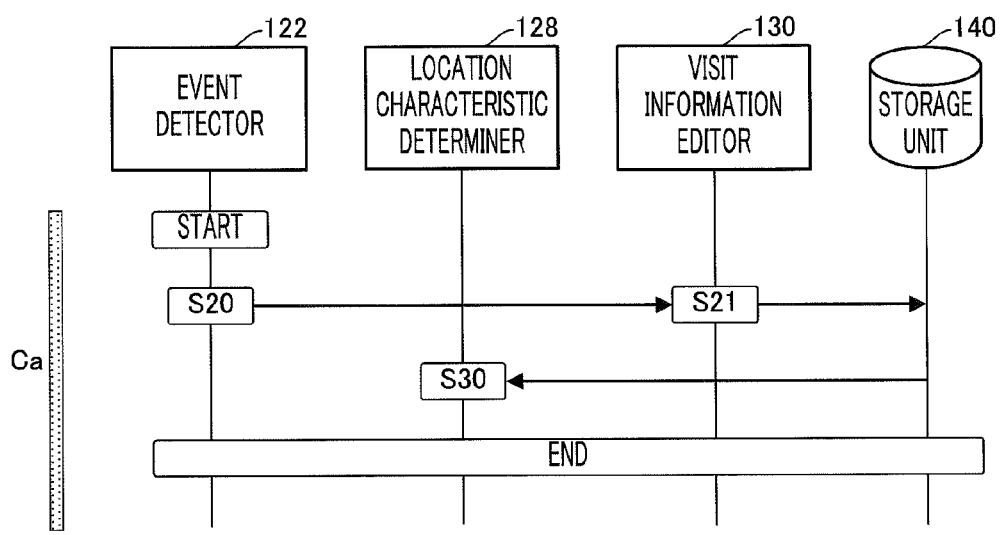
FIG. 6 is a configuration example of visit information stored in a storage unit.
FIG. 7 is an example of a determination operation of a location characteristic.

In the following, a determination operation of a location characteristic according to the present embodiment will be described. FIG. 5 is a flowchart of the determination operation of a location characteristic. FIG. 6 illustrates a configuration of the visit information SI stored in the storage unit 140.

1(3)-1. Types of Events

According to an event detected by the event detector 122, conditional branch is executed in the determination operation of a location characteristic illustrated in FIG. 5. Accordingly, before explaining the determination operation, example of events in the present embodiments will be described below. Meanwhile, the event detector 122 may detect events other than the events as described below.

Event 1a: An application (service) is activated, and a cell identifier CID indicated by the latest visit information element SE matches a current cell identifier CID detected by the cell identifier detector 124.

Event 1b: An application (service) is activated and a cell identifier CID indicated by the latest visit information element SE does not match a current cell identifier CID detected by the cell identifier detector 124.

Event 1c: An application (service) is activated and a cell identifier CID indicated by the latest visit information element SE does not match a current cell identifier CID detected by the cell identifier detector 124, but the current cell identifier CID is determined by the ping-ponging state determiner 126 as being in a ping-ponging state.

Event 2a: A change in a cell identifier CID of a visited cell is detected by the cell identifier detector 124, and the detected new cell identifier CID is determined by the ping-ponging state determiner 126 as not being in a ping-ponging state.

Event 2b: A change in a cell identifier CID of a visited cell is detected by the cell identifier detector 124, and the detected new cell identifier CID is determined by the ping-ponging state determiner 126 as being in a ping-ponging state.

Event 3a: A display (output device) is illuminated, and a cell identifier CID indicated by the latest visit information element SE matches a current cell identifier CID detected by the cell identifier detector 124.

Event 3b: A display (output device) is illuminated, and a cell identifier CID indicated by the latest visit information element SE does not match a current cell identifier CID detected by the cell identifier detector 124.

Event 3c: A display (output device) is illuminated, and a cell identifier CID indicated by the latest visit information element SE does not match a current cell identifier CID detected by the cell identifier detector 124, but the current cell identifier CID is determined by the ping-ponging state determiner 126 as being in a ping-ponging state.

Event 4: A display (output device) is unlocked.

Event 5: The lights of a display (output device) are turned off

Event 6: Connected to wireless LAN.

Event 7a: Charging is started, and the user equipment 100 shifts to a charge state.

Event 7b: Charging ends, and the user equipment 100 shifts to a discharge state.

Event 8: Application requests event activation.

Event 9a: A predetermined time has passed since the previous event detection, and a cell identifier CID indicated by the latest visit information element SE matches a current cell identifier CID detected by the cell identifier detector 124.

Event 9b: A predetermined time has passed since the previous event detection, and a cell identifier CID indicated by the latest visit information element SE does not match a current cell identifier CID detected by the cell identifier detector 124.

Event 9c: A predetermined time has passed since the previous event detection, and a cell identifier CID indicated by the latest visit information element SE does not match a current cell identifier CID detected by the cell identifier detector 124, but the current cell identifier CID is determined by the ping-ponging state determiner 126 as being in a ping-ponging state.

From among the abovementioned events, Events 2a and 2b indicating a change in the cell identifier CID are "cell-change events" and the rest are "no-cell-change events".

1(3)-2. Visit Information

A configuration of visit information SI stored in the storage unit 140 will be described referring to FIG. 6. Visit information SI includes plural visit information elements SE (SE1, SE2, SE3, . . . ). Each visit information element SE indicates information on a visit to a cell C visited by the user equipment 100. The visit information editor 130 can update an already existing visit information element SE and generate a new visit information element SE.

Each visit information element SE includes plural information items. In FIG. 6, each visit information element SE includes a cell identifier CID indicating a visited cell, a visit start time, a visit end time, a visit time length, and a ping-ponging flag indicating a ping-ponging state. Other information items may be included in the visit information elements SE.

1(3)-3. Location Characteristic Determination Operation

When the event detector 122 detects any event (1a, 1b, . . . ), a location characteristic determination operation illustrated in FIG. 5 starts. The event detector 122 determines whether or not the detected event is either Event 2a or Event 2b (in other words, whether the cell identifier detector 124 has detected a change in a cell identifier CID) (S10).

When either an Event 2a or an Event 2b is detected (S10; YES), the visit information editor 130 updates the latest visit information element SE from among plural visit information elements SE in visit information SI corresponding to the cell identifier CID before the cell change (S11). More specifically, the visit information editor 130, as the new visit end time, writes the current time in a visit information element SE having the visit end time that is the closest to the current time, and further writes therein, as the visit time length, the difference between the new visit end time and the visit start time that has been stored in advance. Subsequently, the process proceeds to Step S20. On the other hand, when neither an Event 2a nor an Event 2b is detected (S10; NO), a visit information element SE is not updated and the process proceeds to S20.

Next, the event detector 122 determines whether or not the detected event is any of Events 1a, 1c, 2b, 3a, 3c, 4-8, 9a and 9c (S20). That is, the abovementioned is a determination of whether or not either of the following phenomena is occurring: Phenomenon A: A no-cell-change event is detected, and a cell identifier CID indicated by the latest visit information element SE in visit information SI matches a cell identifier CID detected by the cell identifier detector 124; or Phenomenon B: A cell-change event is detected, and a ping-ponging state is occurring in a cell C after the cell change. In other words, the abovementioned is a determination of whether or not an event in which a substantial cell change has not occurred is detected.

When the result of the determination in Step S20 is YES, the visit information editor 130 updates the latest visit information element SE from among plural visit information elements SE having a current cell identifier CID (that is, a cell identifier CID of the visited cell) detected by the cell identifier detector 124 (S21). More specifically, the visit information editor 130 writes in the abovementioned latest visit information element SE a current time as the new visit end time and the difference between the new visit end time and the already stored visit start time as the visit time length. Subsequently, the process proceeds to Step S30. On the other hand, when the result of the determination in Step S20 is NO, the process proceeds to Step S30 without a visit information element SE being updated.

The location characteristic determiner 128 determines the location characteristic of a cell C (a cell visited by the user equipment 100) indicated by a current cell identifier CID that is detected by the cell identifier detector 124. The location characteristic of a visited cell may be executed using various standards and algorithms. For example, it is preferable for the location characteristic determiner 128 to select one information item included in a visit information element SE corresponding to a current cell identifier CID and to determine location characteristic employing statistics calculated about the selected information item. "Home", "workplace" and "railway station" may be listed as non-limiting examples of a location characteristic.

Next, the event detector 122 determines whether or not the detected event is any of Events 1b, 2a, 3b or 9b (S40). That is, the abovementioned is a determination of whether or not either of the following phenomena is occurring: Phenomenon C: A no-cell-change event is detected, and a cell identifier CID indicated by the latest visit information element SE in visit information SI does not match a cell identifier CID detected by the cell identifier detector 124; or Phenomenon D: A cell-change event is detected, and a ping-ponging state is not occurring in a cell C after cell change. In other words, the abovementioned is a determination of whether or not an event in which a substantial cell change has occurred is detected.

When the result of the determination in Step S40 is YES, the visit information editor 130 generates and writes in visit information SI (storage unit 140) a new visit information element SE corresponding to a cell C (a cell visited by the user equipment 100) indicated by a current cell identifier CID that is detected by the cell identifier detector 124 (S41). Then, the flowchart illustrated in FIG. 5 ends. On the other hand, when the result of the determination in Step S40 is NO, the flowchart illustrated in FIG. 5 ends without a new visit information element SE being generated.

Meanwhile, the generated new visit information element SE includes a current cell identifier CID as a cell identifier and a current time as the visit start time. The visit end time may not necessarily be set at this stage.

It would be preferable to set a time obtained by adding a predetermined value to the current time (visit start time) as the visit end time. If the current time (visit start time) is set as a provisional visit end time when a new visit information element SE is generated due to the cell change, the visit end time of the visit information element SE before the cell change and the visit end time of the visit information element SE after the cell change would be the same resulting in plural latest visit information elements SE. The above phenomenon is not appropriate in a configuration in which the latest visit information element SE is selected based on the visit end time. However, the inappropriate phenomenon above would not occur if the visit end time were set by adding a predetermined value to the current time. It would be even more preferable if the predetermined value added to the visit start time were of a minimum time length (unit time length) that is defined in the radio communication system CS.

As is understood from the determination operation of Steps S20 and S40, in Steps S21 or S41, either of the two steps is executed exclusively. In other words, when a substantial cell change has not occurred, a location characteristic is determined after a visit information element SE being updated, and when there occurs a substantial cell change, a new visit information element SE is generated after the determination of a location characteristic.

1(3)-4. Operation Examples

Below are examples of operations for when each event occurs. FIG. 7 illustrates an operation example for when Event 1a occurs (when a cell change does not occur). It is presumed that the user equipment 100 is visiting the cell Ca in FIG. 7. When the event detector 122 detects Event 1a, after NO is selected at the conditional branch in Step S10, YES is selected at the conditional branch in Step S20 allowing Step S21 to be executed, and the latest visit information element SE of the cell Ca existing in visit information SI is updated. Based on the updated visit information SI, the location characteristic determiner 128 executes the determination of the location characteristic of the cell Ca. NO is selected in Step S40.

Figure 8:
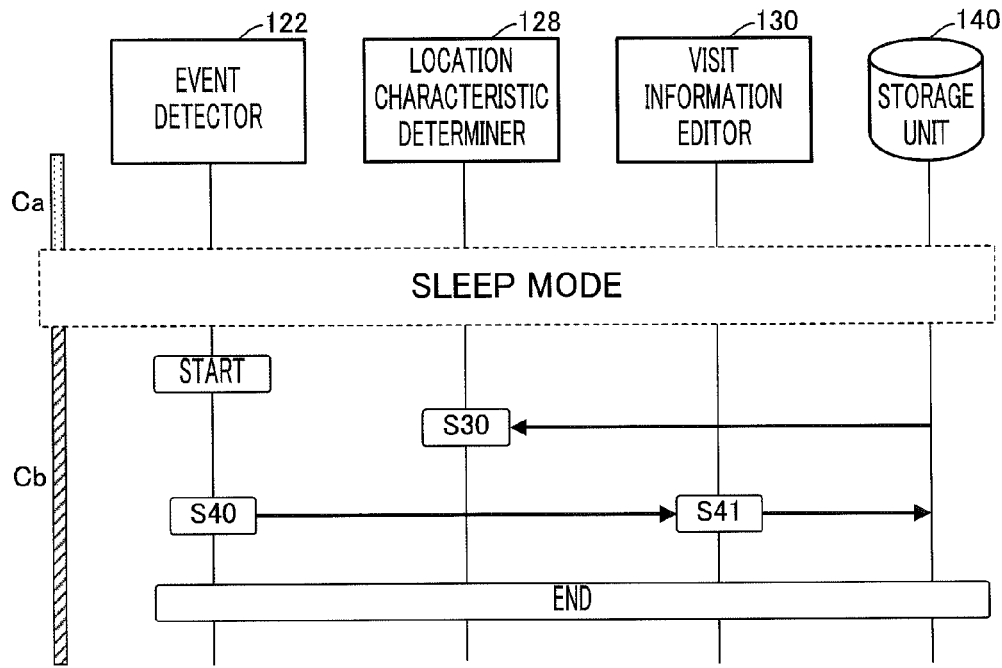
FIG. 8 is an example of a determination operation of a location characteristic.

FIG. 8 illustrates an operation example for when Event 1b occurs (when a cell change occurs). In FIG. 8, it is assumed that the user equipment 100 has shifted to sleep mode while visiting the cell Ca and then moved to the cell Cb during sleep mode. It is further assumed that the cell identifier detector 124 has not detected the change in the cell identifier CID (from Ca to Cb) because it was in sleep mode. When the event detector 122 detects Event 1b, the location characteristic determiner 128 determines the location characteristic of the cell Cb after NO is selected at the conditional branch in Step S10 and Step S20. Next, YES is selected at the conditional branch at Step 40 allowing Step 41 to be executed. Then a new visit information element SE corresponding to the visited cell, the cell Cb, is generated and is written in visit information SI (the storage unit 140).

Figure 9:
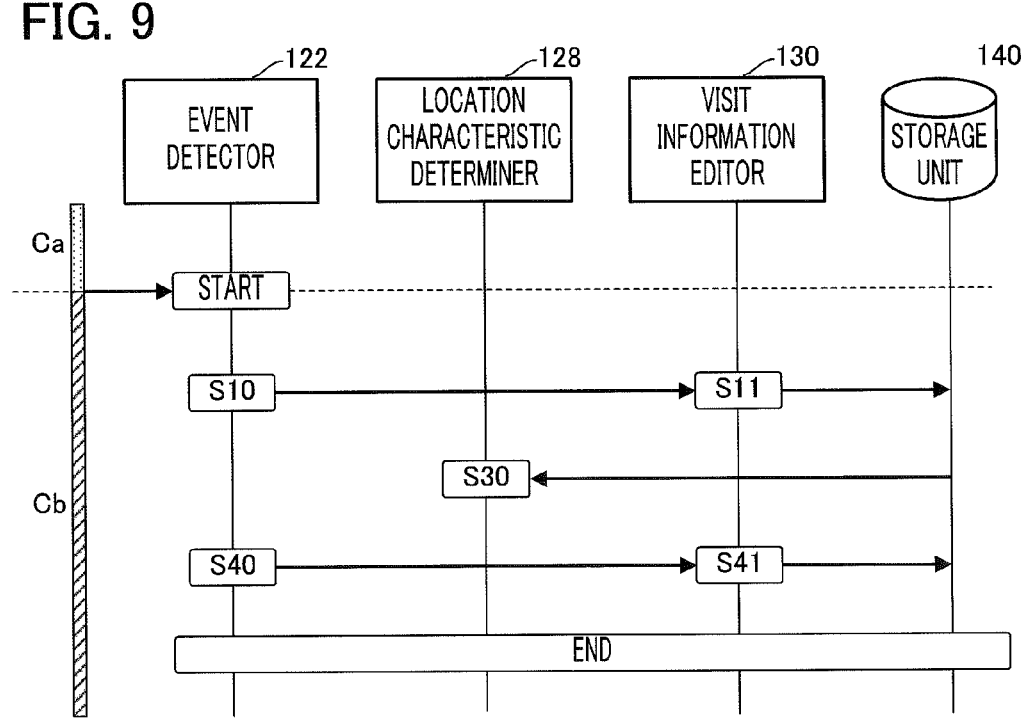
FIG. 9 is an example of a determination operation of a location characteristic.

FIG. 9 illustrates an operation example for when an Event 2a occurs (when a change to a cell identifier CID in which no ping-ponging is occurring is detected). In FIG. 9, it is assumed that the user equipment 100 handovers from a cell Ca to a cell Cb and that a change in a cell identifier CID is detected. When the event detector 122 detects an Event 2a, YES is selected at the conditional branch in Step S10 allowing Step S11 to be executed, and the latest visit information element SE of a cell Ca before cell change, which exists in visit information SI, is updated. After NO is selected at the conditional branch in Step S20, the location characteristic determiner 128 determines a location characteristic of a cell Cb after cell change (S30). Then, YES is selected at the conditional branch in Step S40 allowing Step S41 to be executed, and a new visit information element SE corresponding to the cell Cb after the cell change is generated and is written in visit information SI (the storage unit 140).

Figure 10:
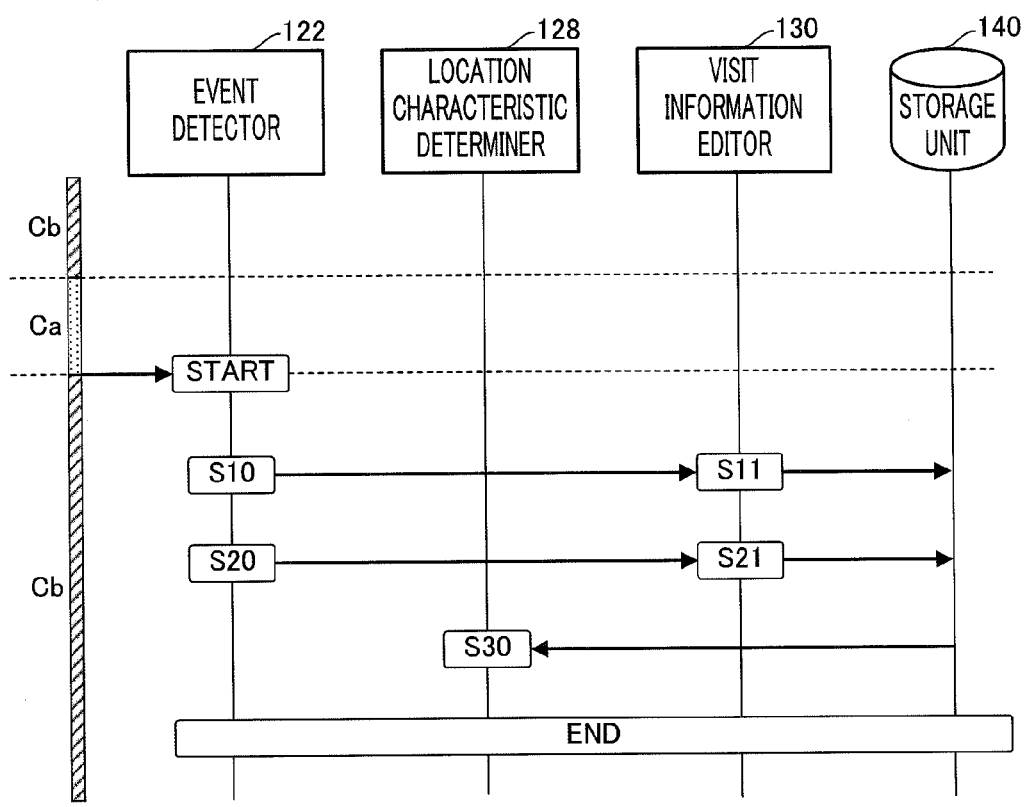
FIG. 10 is an example of a determination operation of a location characteristic.

FIG. 10 illustrates an operation example for when Event 2b occurs (when a change to a cell identifier CID in which ping-ponging is occurring is detected). In FIG. 10, it is assumed that the user equipment 100 has executed a handover from the cell Ca to the cell Cb, in which ping-ponging is occurring, and that a change in a cell identifier CID has been detected. When the event detector 122 detects Event 2b, YES is selected at the conditional branch in Step S10 allowing Step S11 to be executed, and the latest visit information element SE of the cell Ca before the cell change, which exists in visit information SI, is updated. Then, YES is selected at the conditional branch in Step S20 allowing Step S21 to be executed, and the latest visit information element SE of the cell Cb, which exists in visit information SI, is updated. The location characteristic determiner 128 determines the location characteristic of the cell Cb based on the updated visit information SI. NO is selected in Step S40.

1(4). Effects of the Present Embodiment

According to the abovementioned configuration, a determination operation of a location characteristic is executed even when a substantial cell change has not occurred (when a no-cell-change event has been detected). Therefore, by the present embodiment, the location characteristic of a cell C is determined more often and more appropriately compared to a configuration according to which a determination operation of a location characteristic is executed only when a cell change has occurred.

Furthermore, as in the above examples, through the generation of a new visit information element SE after a determination operation of a location characteristic, the use of a new visit information element SE including the visit end time close to the visit start time is avoided in a determination operation of a location characteristic. Thereby, a location characteristic is determined with higher accuracy.

2. Modifications

The above embodiments can be modified in various ways. In the following, specific modifications will be given as examples. Two or more modes selected from the above embodiments and the following examples may be combined as long as they do not conflict.

2(1). Modification 1

Information items included in visit information SE may include various items. Example information items are the day of the week a cell C was visited (visit day), the period of time a cell C was visited (visited time period), the number of times radio communication was executed while the cell C was being visited, and the distance from a cell the user equipment often visits (for example, a cell C corresponding to the user's home). All or part of the information items above may be included in a visit information element SE.

Moreover, beside a cell identifier, other identifiers led out from the cell identifier may be included. For example, the following may be included as "other identifiers": an identifier of the base station 200 that forms a cell C corresponding to the cell identifier; an identifier of a frequency band used in the cell C; and an identifier of an antenna forming the cell C. "Other identifiers" may be identifiers included in cell identifiers or identifiers that are searched with cell identifiers as a key (identifiers not included in cell identifiers).

2(2). Modification 2

In the above embodiments, the user equipment 100 has the event detector 122 (the cell identifier detector 124 and the ping-ponging state determiner 126), the location characteristic determiner 128, the visit information editor 130, and the storage unit 140 (visit information SI). However, at least one of the above elements may be provided at an apparatus (for example, the base station 200 or an exclusive server apparatus) provided in the network NW. For example, all or any of the location characteristic determiner 128, the visit information editor 130, and the storage unit 140 may be provided at an apparatus in the network NW. In other words, each of the elements for implementing the present invention may be provided at a freely selected place in the radio communication system CS.

2(3). Modification 3

The user equipment 100 is a freely selected apparatus capable of performing radio communication with the base station 200. The user equipment 100 may be a portable telephone terminal such as a feature phone or a smart phone, may be a desktop personal computer, a notebook personal computer, a UMPC (Ultra-Mobile Personal Computer), a portable game device, or any other radio terminal.

2(4). Modification 4

The functions executed by respective CPUs in each of the elements (the user equipment 100 and the base station 200) of the radio communication system CS may be executed by hardware instead of by the CPUs, or may be executed by programmable logic devices such as an FPGA (Field Programmable Gate Array) and a DSP (Digital Signal Processor).

DESCRIPTION OF REFERENCE SIGNS

100 . . . user equipment, 110 . . . radio communication unit, 120 . . . controller, 122 . . . event detector, 124 . . . cell identifier detector, 126 . . . ping-ponging state determiner, 128 . . . location characteristic determiner, 130 . . . visit information editor, 140 . . . storage unit, 200 . . . base station, 210 . . . radio communication unit, 220 . . . network communication unit, 230 . . . controller, C (Ca,Cb) . . . cell, CID . . . cell identifier, CS . . . radio communication system, Cx . . . virtual cell, NW . . . network, SE . . . visit information element, and SI . . . visit information.

The invention claimed is:

1. A radio communication system comprising:
a visit information storage unit configured to store plural visit information elements each indicating information about a visit to a cell visited by a user equipment;
an event detector configured to detect an event from among plural events that occurs in the user equipment;
a cell identifier detector configured to detect a cell identifier that indicates the cell visited by the user equipment; and
a location characteristic determiner configured to determine a location characteristic of the cell indicated by the cell identifier based on one or more visit information elements corresponding to the cell,
wherein the location characteristic is a role or function of a place corresponding to the cell,
wherein the location characteristic determiner determines the location characteristic of the cell visited by the user equipment when the event detector detects a no-cell-change event among the plural events,
wherein the no-cell-change event is not a cell-change event that indicates a change in the cell identifier, and wherein the no-cell-change event is not a ping-ponging cell-change event.

2. The radio communication system according to claim 1, further comprising a visit information editor configured to edit the visit information elements, wherein, when the event detector detects the no-cell-change event and a cell identifier indicated by a latest visit information element that corresponds to a latest visit from among the plural visit information elements stored in the visit information storage unit matches the cell identifier detected by the cell identifier detector, subsequent to the visit information editor having updated the latest visit information element, the location characteristic determiner determines the location characteristic of the cell indicated by the cell identifier detected by the cell identifier detector, and wherein, when the event detector detects the no-cell-change event and a cell identifier indicated by the latest visit information element that corresponds to the latest visit from among the plural visit information elements stored in the visit information storage unit does not match the cell identifier detected by the cell identifier detector, subsequent to the location characteristic determiner having determined the location characteristic of the cell indicated by the cell identifier that is detected by the cell identifier detector, the visit information editor generates and writes in the visit information storage unit a new visit information element corresponding to the cell identifier detected by the cell identifier detector.

3. The radio communication system according to claim 2, further comprising a ping-ponging state determiner configured to determine whether a ping-ponging state has occurred, in which state start and ending of a visit to a single cell is repeated, wherein, when the event detector detects the cell-change event, the visit information editor updates the latest visit information element from among plural visit information elements corresponding to a cell identifier before the cell change, wherein, when the ping-ponging state determiner determines that the ping-ponging state has occurred in the cell after the cell change, subsequent to the visit information editor having updated a visit information element corresponding to the latest visit to the cell after the cell change, the location characteristic determiner determines the location characteristic of the cell after the cell change, and wherein, when the ping-ponging state determiner determines that the ping-ponging state has not occurred in the cell after the cell change, subsequent to the location characteristic determiner having determined the location characteristic of the cell after cell change, the visit information editor generates and writes in the visit information storage unit a new visit information element corresponding to the cell after the cell change.

4. The radio communication system according to claim 2, wherein the visit information editor generates the new visit information element that includes a time obtained by adding a predetermined value to a current time as a visit end time.

5. A location characteristic determination method comprising:

in a radio communication system comprising a visit information storage unit configured to store plural visit information elements each indicating information about a visit to a cell visited by a user equipment, detecting an event from among plural events that occurs in the user equipment;

detecting a cell identifier indicating the cell visited by the user equipment; and determining a location characteristic of the cell indicated by the cell identifier based on one or more visit information elements corresponding to the cell, wherein the location characteristic is a role or function of a place corresponding to the cell, wherein, when a no-cell-change event among the plural events is detected, the location characteristic of the cell visited by the user equipment is determined, wherein the no-cell-change event is not a cell-change event that indicates a change in the cell identifier, and wherein the no-cell-change event is not a ping-ponging cell-change event.

* * * * *